US012670870B2

(12) United States Patent
Oh et al.

(10) Patent No.: US 12,670,870 B2
(45) Date of Patent: Jun. 30, 2026

(54) DISPLAY APPARATUS FOR IMPROVING CHARGING DEVIATION

(71) Applicant: LG Display Co., Ltd., Seoul (KR)

(72) Inventors: Dae Seok Oh, Paju-si (KR); Yong Hwa Park, Paju-si (KR); Seung Hwan Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/184,289

(22) Filed: Apr. 21, 2025

(65) Prior Publication Data

US 2026/0155108 A1 Jun. 4, 2026

(30) Foreign Application Priority Data

Dec. 2, 2024 (KR) ........................ 10-2024-0176158

(51) Int. Cl.
*G09G 3/3275* (2016.01)

(52) U.S. Cl.
CPC ... *G09G 3/3275* (2013.01); *G09G 2300/0819* (2013.01); *G09G 2310/027* (2013.01); *G09G 2320/0673* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 8,373,729 B2 * | 2/2013 | Lee | G09G 3/3648 349/56 |
| 8,405,685 B2 * | 3/2013 | Chang | G09G 5/10 345/89 |
| 9,230,469 B2 * | 1/2016 | Lee | G09G 3/3648 |
| 2018/0233100 A1 * | 8/2018 | Shin | G09G 3/3677 |

FOREIGN PATENT DOCUMENTS

| | | |
|---|---|---|
| KR | 10-2016-0078761 B1 | 7/2016 |
| KR | 10-2019-0059625 B1 | 5/2019 |

* cited by examiner

*Primary Examiner* — Julie Anne Watko
(74) *Attorney, Agent, or Firm* — Morgan, Lewis & Bockius LLP

(57) ABSTRACT

A display apparatus includes a display panel and a source driver including a digital-to-analog converter configured to map image data to gamma voltages, obtained through voltage division between a high-level gamma voltage and a low-level gamma voltage, to generate a data voltage and output the data voltage to a data line of the display panel, wherein a voltage difference between the high-level gamma voltage and the low-level gamma voltage is different at a first time and a second time in one frame.

11 Claims, 11 Drawing Sheets

FIG. 8

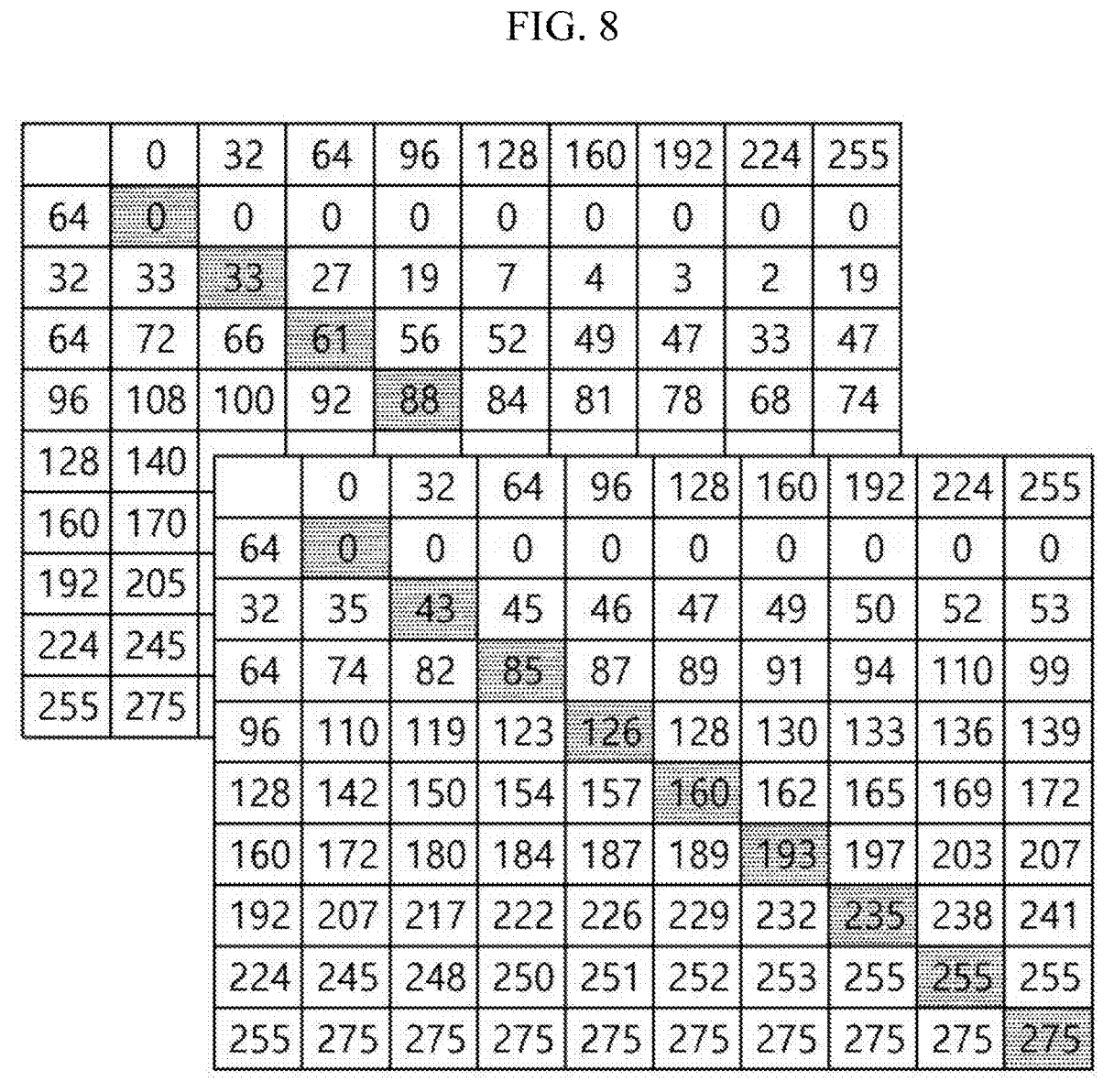

| | 0 | 32 | 64 | 96 | 128 | 160 | 192 | 224 | 255 |
|---|---|---|---|---|---|---|---|---|---|
| 64 | 0 | 0 | 0 | 0 | 0 | 0 | 0 | 0 | 0 |
| 32 | 33 | 33 | 27 | 19 | 7 | 4 | 3 | 2 | 19 |
| 64 | 72 | 66 | 61 | 56 | 52 | 49 | 47 | 33 | 47 |
| 96 | 108 | 100 | 92 | 88 | 84 | 81 | 78 | 68 | 74 |
| 128 | 140 | | | | | | | | |
| 160 | 170 | | | | | | | | |
| 192 | 205 | | | | | | | | |
| 224 | 245 | | | | | | | | |
| 255 | 275 | | | | | | | | |

| | 0 | 32 | 64 | 96 | 128 | 160 | 192 | 224 | 255 |
|---|---|---|---|---|---|---|---|---|---|
| 64 | 0 | 0 | 0 | 0 | 0 | 0 | 0 | 0 | 0 |
| 32 | 35 | 43 | 45 | 46 | 47 | 49 | 50 | 52 | 53 |
| 64 | 74 | 82 | 85 | 87 | 89 | 91 | 94 | 110 | 99 |
| 96 | 110 | 119 | 123 | 126 | 128 | 130 | 133 | 136 | 139 |
| 128 | 142 | 150 | 154 | 157 | 160 | 162 | 165 | 169 | 172 |
| 160 | 172 | 180 | 184 | 187 | 189 | 193 | 197 | 203 | 207 |
| 192 | 207 | 217 | 222 | 226 | 229 | 232 | 235 | 238 | 241 |
| 224 | 245 | 248 | 250 | 251 | 252 | 253 | 255 | 255 | 255 |
| 255 | 275 | 275 | 275 | 275 | 275 | 275 | 275 | 275 | 275 |

DISPLAY APPARATUS FOR IMPROVING CHARGING DEVIATION

CROSS-REFERENCE TO RELATED APPLICATIONS

This application claims the benefit of and priority to Korean Patent Application No. 10-2024-0176158 filed on Dec. 2, 2024, the entire contents of which are incorporated herein by reference for all purposes.

BACKGROUND

1. Technical Field

The present disclosure relates to a display apparatus for improving a charging deviation.

2. Description of the Related Art

As sizes of display apparatuses increase, loads of data lines may increase, and thus, due to the RC delay of data lines, the charging characteristic of pixels may vary based on a panel position. Unlike a panel position close to a source driver, it is difficult to charge up to a target level for a predetermined time at a far panel position.

In association with the same data voltage, a charging deviation occurs between a pixel close to a source driver and a pixel far away from the source driver, causing a luminance deviation. A panel position-based charging deviation caused by RC delay increases progressively as a panel resolution and a frame frequency increase.

The description of the related art should not be assumed to be prior art merely because it is mentioned in or associated with this section. The description of the related art includes information that describes one or more aspects of the subject technology, and the description in this section does not limit the invention.

SUMMARY

To overcome the aforementioned problem of the related art, the present disclosure may provide a display apparatus for improving a charging deviation, which may decrease a panel position-based charging deviation to improve image quality.

To achieve these aspects and other advantages and in accordance with the purpose of the disclosure, as embodied and broadly described herein, a display apparatus includes: a display panel; and a source driver including a digital-to-analog converter configured to map image data to gamma voltages, obtained through voltage division between a high-level gamma voltage and a low-level gamma voltage, to generate a data voltage and output the data voltage to a data line of the display panel, wherein a voltage difference between the high-level gamma voltage and the low-level gamma voltage is different at a first time and a second time in one frame.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings:

FIG. 8 is a lookup table storing intermediate compensation values based on data deviation values;

Figure 1A:
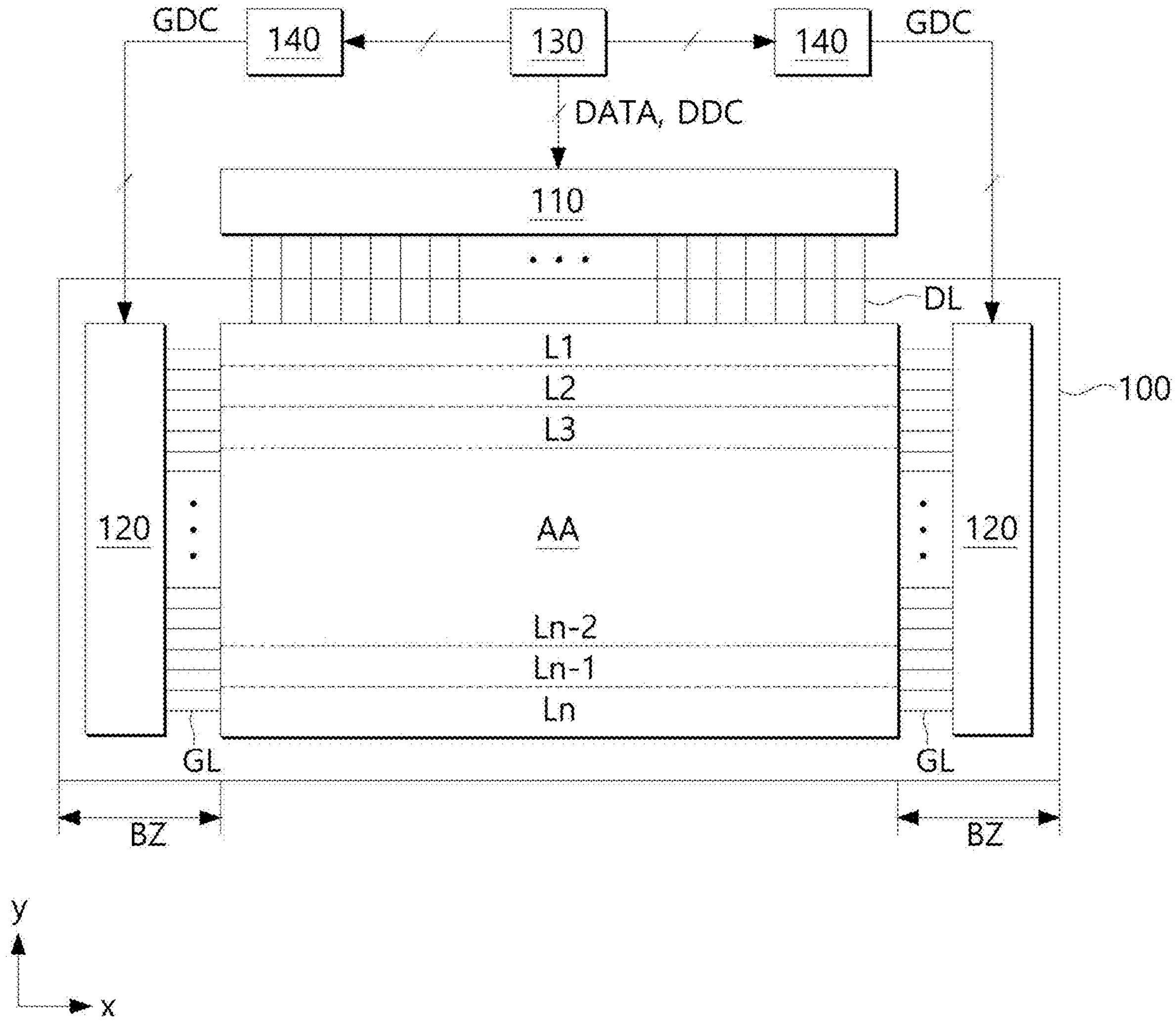
FIG. 1A is a block diagram illustrating a display apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this specification, the same elements are denoted by the same reference numerals. As used herein, the terms “comprise”, “having”, “including” and the like suggest that other parts can be added unless the term “only” is used. As used herein, the singular forms “a”, “an”, and “the” are intended to include the plural forms as well, unless context clearly indicates otherwise. For example, an element may be one or more elements. An element may include a plurality of elements. The word “exemplary” is used to mean serving as an example or illustration. Embodiments are example embodiments. Aspects are example aspects. In one or more implementations, “embodiments,” “examples,” “aspects,” and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term “may” encompasses all the meanings of the term “can.”

Elements in various embodiments of the present disclosure are to be interpreted as including margins of error even without explicit statements.

In describing a position relationship, for example, when a position relation between two parts is described as “on~”, “over~”, “under~”, and “next~”, one or more other parts may be disposed between the two parts unless “just” or “direct” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 1B:
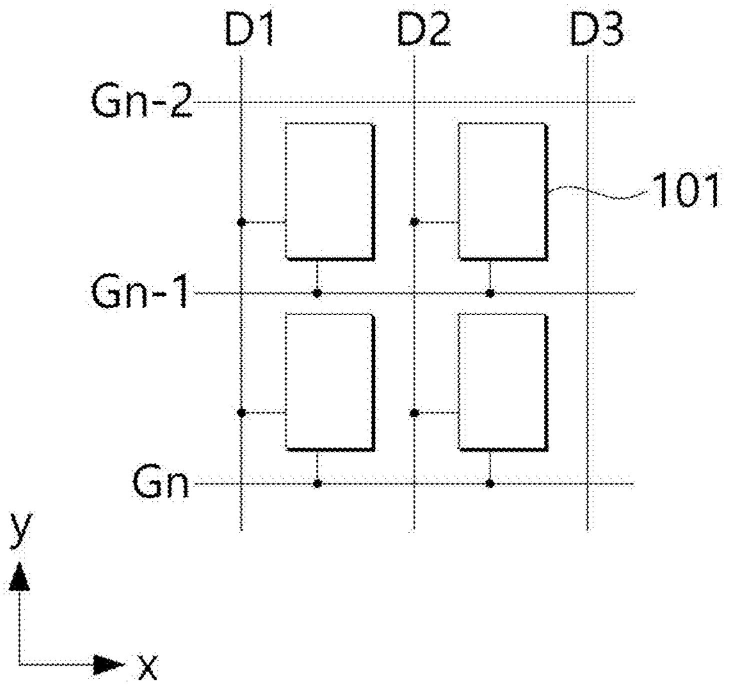
FIG. 1B is a pixel array included in a screen of a display panel.

FIG. 1A is a block diagram illustrating a display apparatus according to an embodiment of the present disclosure, and FIG. 1B is a pixel array included in a screen of a display panel.

Referring to FIG. 1A and FIG. 1B, a display panel 100 according to an embodiment of the present embodiment may include a screen AA which displays an input image. The screen AA may include a pixel array which displays pixel data (hereinafter referred to as “image data”) DATA of an input image. The pixel array may include a plurality of data lines DL, a plurality of gate lines GL intersecting with the data lines DL, and a plurality of pixels.

The pixels may be arranged on the screen AA in a matrix type defined by intersections between the data lines DL and the gate lines GL. The pixels may be arranged as various types such as a stripe type, a diamond type, and a type which shapes pixels emitting lights of the same color, in addition to a matrix type, on the screen AA.

The pixel array may include a plurality of pixel columns and a plurality of pixel rows L1 to Ln intersecting with the pixel columns. Each of the pixel columns may include pixels which are arranged in a y-axis direction. A pixel row may include pixels which are arranged in an x-axis direction. One vertical period may be one frame period needed for charging image data DATA of one frame in all pixels of the screen. One horizontal period may be a time obtained by dividing one frame period by the number of pixel rows L1 to Ln. One horizontal period may be a time needed for charging the image data DATA of one pixel row, sharing a gate line GL, in pixels of one pixel row.

Each of the pixels may include a red (R) subpixel 101, a green (G) subpixel 101, and a blue (B) subpixel 101 for color implementation. Each of the pixels may further include a white subpixel 101.

In an organic light emitting display apparatus, a pixel circuit may include a light emitting device, a driving element, one or more switch elements, and a capacitor. The light emitting device may be implemented as an organic light emitting diode (OLED). A current of the OLED may be adjusted based on a gate-source voltage of the driving element. Each of the driving element and the switch element may be implemented as a transistor. A semiconductor layer of the transistor may include amorphous silicone or polysilicone. A semiconductor layer of at least some of transistors may include oxide. The pixel circuit may be connected to a data line DL and a gate line GL. In FIG. 1, “D1 to D3” illustrated in a circle may be data lines, and “Gn-2 to Gn” may be gate lines. Also, each of the subpixels 101 of FIG. 1 may include the same pixel circuit.

Touch sensors may be disposed on the display panel 100. The touch sensors may be arranged as an on-cell or add-on type on the screen AA of the display panel 100, or may be implemented as in-cell type touch sensors embedded in the pixel array. A touch input may be sensed through the touch sensors, or may be sensed through only pixels even without touch sensors.

A display panel driver may include a source driver 110 and a gate driver 120. The display panel driver may write image data DATA in the pixels of the display panel 100, based on control by the timing controller 130.

The source driver 110 may convert the image data DATA, received from the timing controller 130, into gamma voltages by using a digital-to-analog converter (DAC) to generate data voltages. The source driver 110 may supply the data voltages to the data lines DL. The data voltages may be supplied to the data lines DL and may be applied to the driving elements through switch elements of the subpixels 101. The source driver 110 may be implemented with one or more source drive integrated circuits. Each of the source drive integrated circuits may further include a touch driver which generates a touch sensor driving signal and converts an electric charge variation of a touch sensor into touch raw data.

The gate driver 120 may be provided in a bezel region BZ which is outside a screen and does not display an image on the display panel 100. The gate driver 120 may sequentially supply a gate signal, synchronized with data voltages, to the gate lines GL according to control by the timing controller 130. The gate signal may simultaneously activate pixel lines where the data voltages are charged. The gate driver 120 may output the gate signal by using one or more shift registers and may shift the gate signal. The gate signal may include one or more scan signals SCAN and an emission control signal EM.

The timing controller 130 may receive video data DATA and a timing signal, synchronized with the video data DATA, from the host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time for which the image data DATA is transferred in the vertical period or the horizontal period. The vertical period and the horizontal period may be known based on a method of counting the data enable signal DE, and thus, the vertical synchronization signal Vsync and the horizontal synchronization signal Hsync may be omitted.

The timing controller 130 may transfer the image data DATA to the source driver 110 through an internal interface circuit. The first interface circuit may be implemented as an embedded clock point to point interface (EPI), but is not limited thereto.

The timing controller 130 may generate a source timing control signal DDC for controlling an operation timing of the source driver 110 and a gate timing control signal GDC for controlling an operation timing of the gate driver 120, based on the timing signal Vsync, Hsync, and DE received from the host system.

The timing controller 130 may multiply an input frame frequency by i (where i may be a natural number) times to control an operation timing of the display panel driver 110 and 120, based on a frame frequency of an input frame frequency×i Hz. The input frame frequency may be about 60 Hz in national television standards committee (NTSC) scheme and may be about 50 Hz in phase-alternating line (PAL) scheme.

The host system may be one of a television (TV) system, a set-top box, a navigation system, a personal computer (PC), a home theater system, an automotive display system, a mobile device, and a wearable device. In mobile devices and wearable devices, the source driver 110, the timing controller 130, and the level shifter 140 may be integrated into one drive integrated circuit (IC).

The level shifter 140 may convert a voltage of the gate timing control signal GDC, output from the timing controller 130, to a gate high voltage VGH and a gate low voltage VGL to supply to the gate driver 120. A low-level voltage of the gate timing control signal GDC may be shifted to the gate low voltage VGL, and a high-level voltage of the gate timing control signal GDC may be shifted to the gate high voltage VGH.

Figure 2:
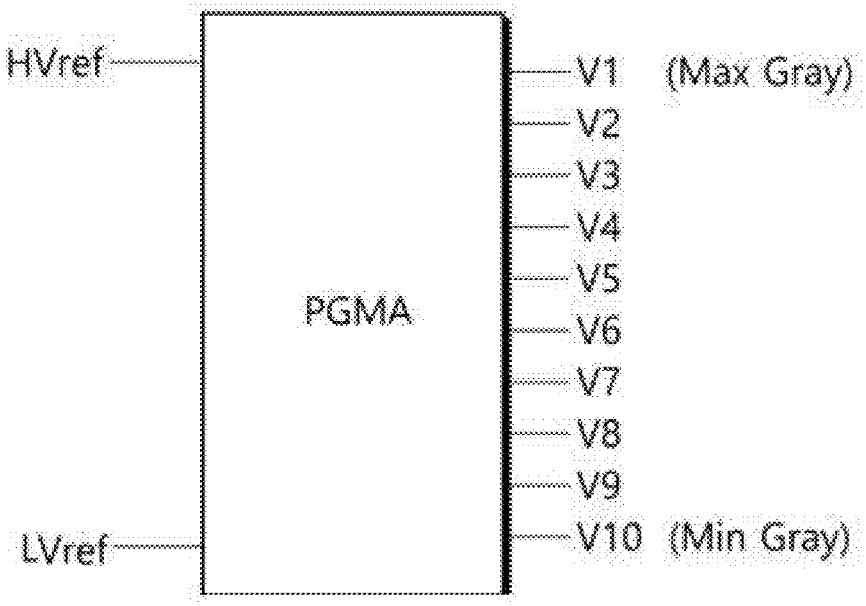
FIG. 2 is a diagram illustrating a programmable gamma circuit included in a digital-to-analog converter.
Figure 3:
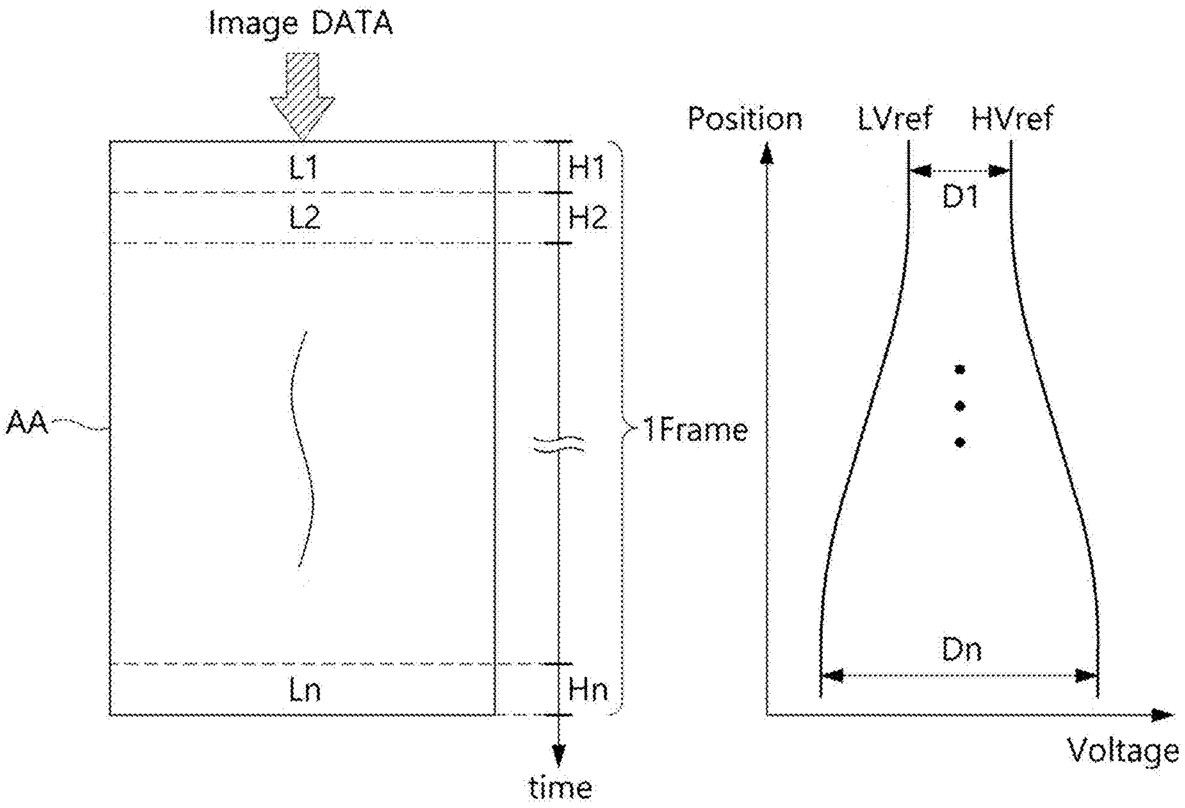
FIG. 3 is a diagram illustrating an example where a voltage difference between a high-level gamma voltage and a low-level gamma voltage varies over time in one frame.
Figure 4:
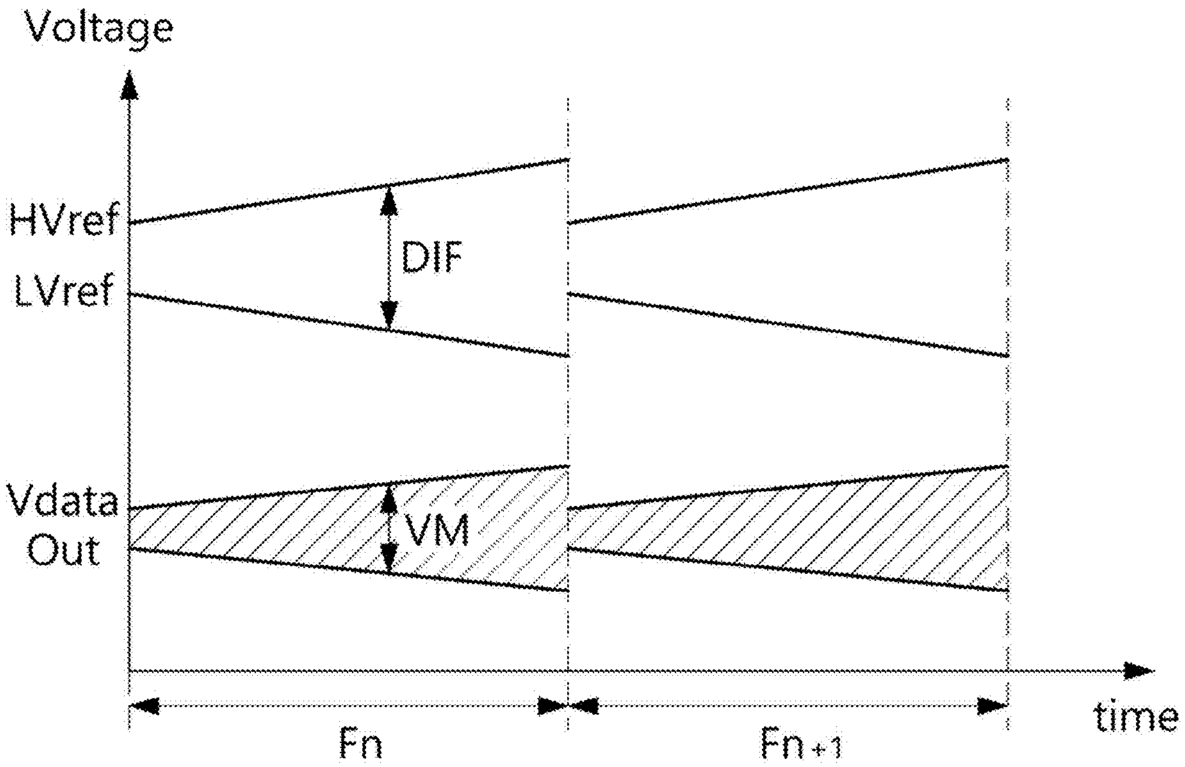
FIG. 4 is a diagram illustrating an example where a data voltage corresponding to the same gray level varies over time in one frame.

FIG. 2 is a diagram illustrating a programmable gamma circuit included in a digital-to-analog converter. FIG. 3 is a diagram illustrating an example where a voltage difference between a high-level gamma voltage and a low-level gamma voltage varies over time in one frame. FIG. 4 is a diagram illustrating an example where a data voltage corresponding to the same gray level varies over time in one frame.

The DAC of the source driver 110 may include a programmable gamma circuit (or a gamma circuit) PGMA as in FIG. 2. The programmable gamma circuit PGMA may receive a high-level gamma voltage HVref and a low-level gamma voltage LVref and may map image data to gamma voltages obtained through voltage division by a plurality of tap nodes between the high-level gamma voltage HVref and the low-level gamma voltage LVref to generate data voltages.

Each of the gamma voltages V1 to V10 obtained by voltage-dividing a voltage difference between the high-level gamma voltage HVref and the low-level gamma voltage LVref may be a gamma reference voltage. Gamma reference voltage V1 may be mapped to image data of a maximum gray level. Gamma reference voltage V10 may be mapped to image data of a minimum gray level. The programmable gamma circuit PGMA may further voltage-divide a voltage difference between adjacent gamma reference voltages V1 to V10 to generate gamma voltages corresponding to the number of grayscales. Accordingly, the grayscale resolution can be increased.

To decrease a panel position-based charging deviation, the high-level gamma voltage HVref and the low-level gamma voltage LVref may be adjusted based on an analog compensation concept of a multi-feedback scheme in one frame as in FIG. 3.

In one frame, a voltage difference between the high-level gamma voltage HVref and the low-level gamma voltage LVref may vary. The voltage difference between the high-level gamma voltage and the low-level gamma voltage is different at a first time and a second time in one frame.

A first pixel row L1 among first to $n^{th}$ pixel rows L1 to Ln may be disposed closest to an output terminal of a source driver, and the $n^{th}$ pixel row Ln may be disposed farthest away from the output terminal of the source driver.

In this case, during a first horizontal period H1 allocated in charging pixels of the first pixel row L1 with data voltages, a voltage difference between the high-level gamma voltage HVref and the low-level gamma voltage LVref may be D1. On the other hand, during an $n^{th}$ horizontal period Hn allocated in charging pixels of the $n^{th}$ pixel row Ln with data voltages, a voltage difference between the high-level gamma voltage HVref and the low-level gamma voltage LVref may be Dn which is greater than D1.

As in FIG. 4, in one frame, a voltage difference DIF between the high-level gamma voltage HVref and the low-level gamma voltage LVref may increase as a time elapses toward the $n^{th}$ horizontal period Hn. To this end, in one frame, the high-level gamma voltage HVref may increase over time, and a voltage difference between the high-level gamma voltage HVref and the low-level gamma voltage LVref may decrease. When the voltage difference between the high-level gamma voltage HVref and the low-level gamma voltage LVref increases, levels of the gamma reference voltages V1 to V10 obtained through voltage division by the plurality of tap nodes may increase. V1 of the $n^{th}$ horizontal period Hn may be greater than V1 of the first horizontal period H1, and moreover, V10 of the $n^{th}$ horizontal period Hn may be greater than V10 of the first horizontal period H1.

As described above, because a level of a gamma voltage mapped to image data of the same gray level varies, a data voltage VM of the $n^{th}$ pixel row Ln corresponding to the $n^{th}$ horizontal period Hn may be greater than a data voltage VM of the first pixel row L1 corresponding to the first horizontal period H1. As a result, because a relatively high data voltage VM is applied to the $n^{th}$ pixel row Ln where RC delay is relatively large, a data charging deviation based on a panel position may be reduced.

A voltage difference variation period between the high-level gamma voltage HVref and the low-level gamma voltage LVref may be one frame period. In an $n^{th}$ frame Fn and an $n^{th}$+1 frame Fn+1, voltage difference variation patterns between the high-level gamma voltage HVref and the low-level gamma voltage LVref may be equal to each other.

Figure 5:
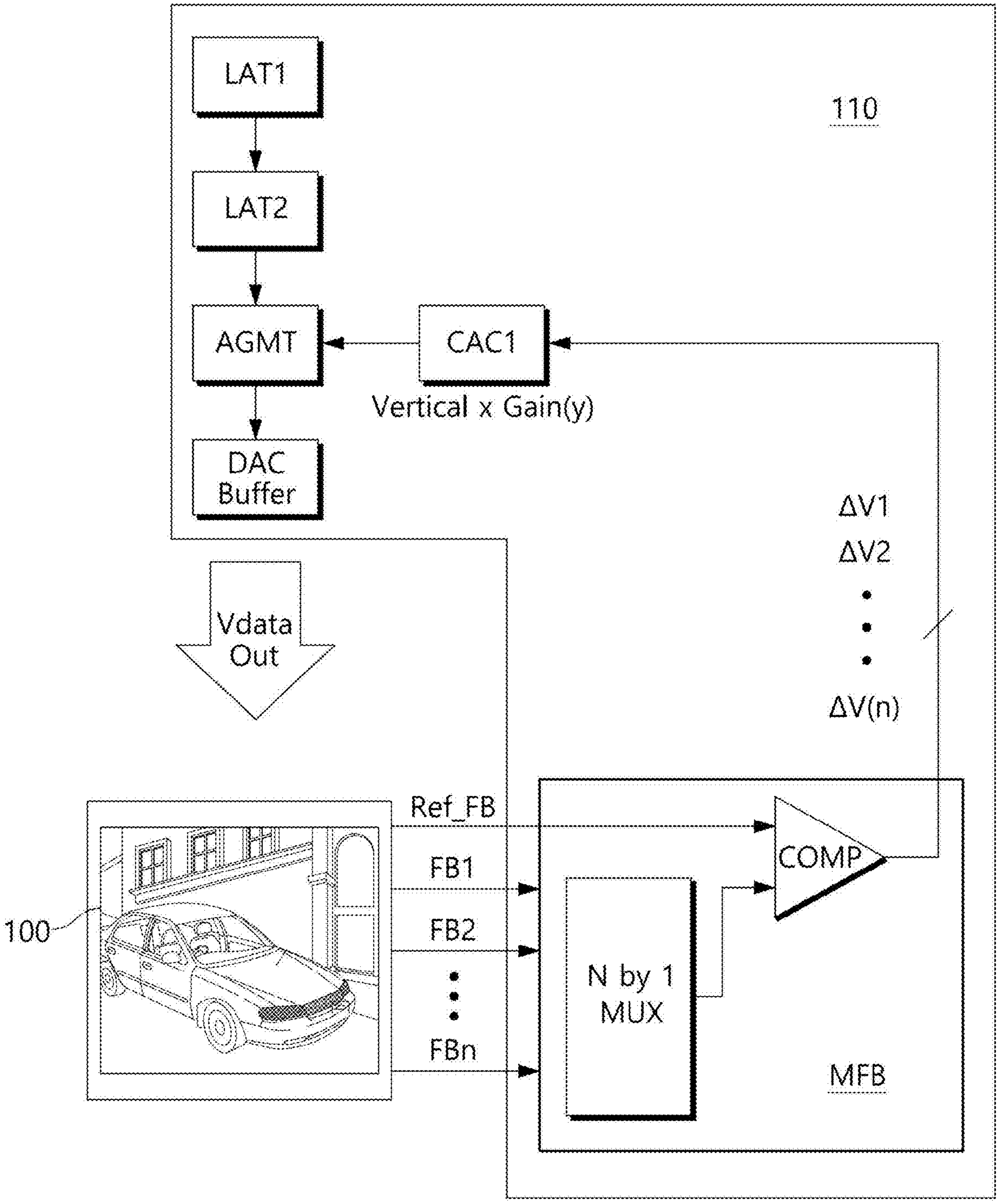
FIG. 5 is a diagram illustrating a configuration of a source driver to which an analog compensation concept of a multi-feedback scheme is applied.
Figure 6A:
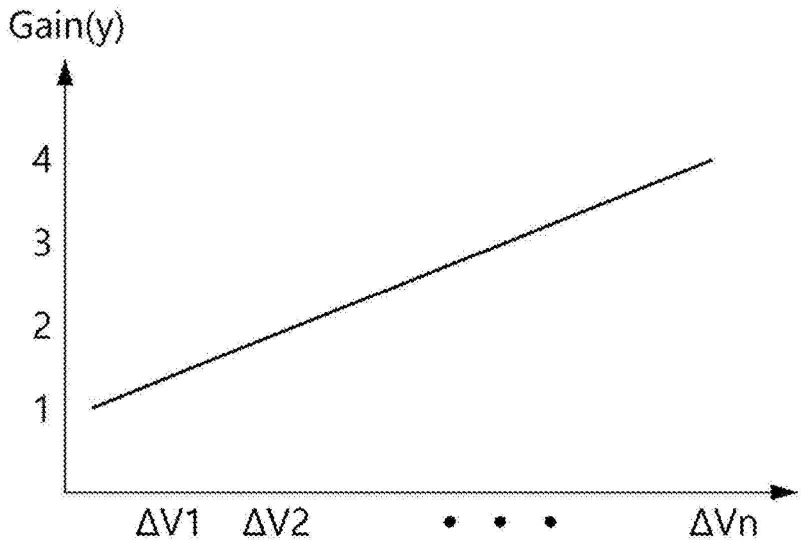
FIG. 6A is a diagram illustrating a gain value corresponding to each of first to $n^{th}$ deviation values of FIG. 5.
Figure 6B:
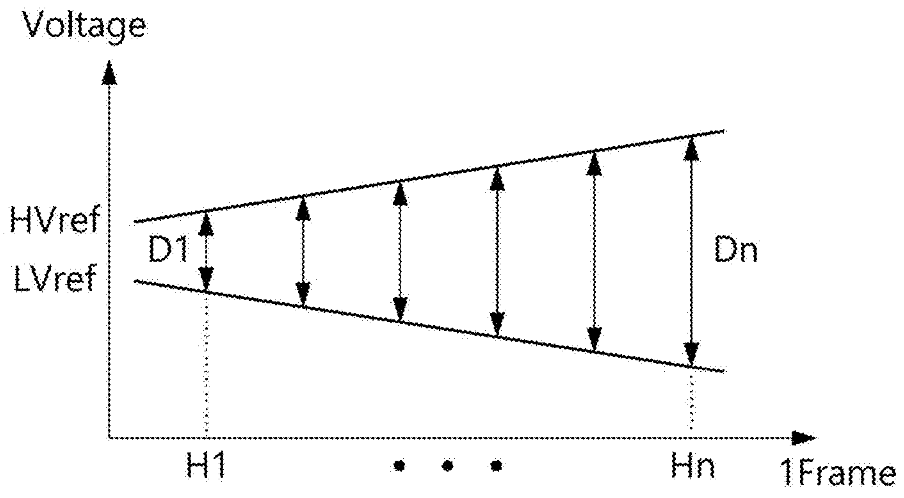
FIG. 6B is a diagram illustrating an example where a voltage difference between a high-level gamma voltage and a low-level gamma voltage increases by one horizontal period units in one frame.

FIG. 5 is a diagram illustrating a configuration of a source driver to which an analog compensation concept of a multi-feedback scheme is applied. FIG. 6A is a diagram illustrating a gain value corresponding to each of first to $n^{th}$ deviation values of FIG. 5. FIG. 6B is a diagram illustrating an example where a voltage difference between a high-level gamma voltage and a low-level gamma voltage increases by one horizontal period units in one frame.

Referring to FIG. 5, an analog compensation concept of a multi-feedback scheme may be implemented with a source driver 110 which includes a multi-feedback circuit MFB, a first calculation circuit CAC1, a first auxiliary latch AGMT, and a DAC.

The multi-feedback circuit MFB may receive a reference feedback voltage Ref_FB at a reference position of a data line, may receive first to $n^{th}$ feedback voltage FB1, FB2, . . . , and FBn at first to $n^{th}$ positions of the data line, and may compare the reference feedback voltage Ref_FB with the first to $n^{th}$ feedback voltage FB1, FB2, . . . , and FBn to sequentially output first to $n^{th}$ deviation values ΔV1, ΔV2, . . . , and ΔVn.

The multi-feedback circuit MFB may include an N:1 multiplexer MUX and an analog comparator (or a comparator) COMP.

The multiplexer MUX may receive the first feedback voltage FB1 from a first position of a data line during a first horizontal period and may supply the first feedback voltage FB1 to the comparator COMP. Therefore, the analog comparator COMP may compare the reference feedback voltage Ref_FB, receiving at a reference position of the data line, with the first feedback voltage FB1 input from the multiplexer MUX to output a first deviation value ΔV1.

The multiplexer MUX may receive the second feedback voltage FB2 from a second position of the data line during a second horizontal period and may supply the second feedback voltage FB2 to the comparator COMP. Therefore, the analog comparator COMP may compare the reference feedback voltage Ref_FB, receiving at the reference position of the data line, with the second feedback voltage FB2 input from the multiplexer MUX to output a second deviation value ΔV2.

The multiplexer MUX may receive the $n^{th}$ feedback voltage FBn from an $n^{th}$ position of the data line during an $n^{th}$ horizontal period and may supply the $n^{th}$ feedback voltage FBn to the comparator COMP. Therefore, the analog comparator COMP may compare the reference feedback voltage Ref_FB, receiving at the reference position of the data line, with the $n^{th}$ feedback voltage FBn input from the multiplexer MUX to output an $n^{th}$ deviation value ΔVn.

Here, first to $n^{th}$ positions of the data line may respectively correspond to the first to $n^{th}$ pixel rows of the display panel, and the reference position of the data line may be closer to the output terminal of the source driver than each of the first to $n^{th}$ positions.

As in FIG. 6A, the first calculation circuit CAC1 may output first to $n^{th}$ high-level gamma voltage adjustment values and first to $n^{th}$ low-level gamma voltage adjustment values, based on an analog gain value Gain(y) corresponding to each of first to $n^{th}$ deviation values ΔV1, ΔV2, . . . , and ΔVn. The analog gain value Gain(y) may increase in proportion to the first to $n^{th}$ deviation values ΔV1, ΔV2, . . . , and ΔVn.

The first calculation circuit CAC1 may adjust the first high-level gamma voltage adjustment value and the first low-level gamma voltage adjustment value during a first horizontal period H1, based on a gain value Gain(y) corresponding to the first deviation value ΔV1. The first calculation circuit CAC1 may adjust the first high-level gamma voltage adjustment value and the first low-level gamma voltage adjustment value during a second horizontal period H2, based on a gain value Gain(y) corresponding to the second deviation value ΔV2. Likewise, the first calculation circuit CAC1 may adjust the first high-level gamma voltage adjustment value and the first low-level gamma voltage adjustment value during an $n^{th}$ horizontal period Hn, based on a gain value Gain(y) corresponding to the $n^{th}$ deviation value ΔVn.

The first auxiliary latch AGMT may store the first to $n^{th}$ high-level gamma voltage adjustment values and the first to $n^{th}$ low-level gamma voltage adjustment values, and then, may supply the first to $n^{th}$ high-level gamma voltage adjustment values and the first to $n^{th}$ low-level gamma voltage adjustment values to the DAC.

The first auxiliary latch AGMT may store the first high-level gamma voltage adjustment value and the first low-level gamma voltage adjustment value during the first horizontal period H1, and then, may supply the first high-level gamma voltage adjustment value and the first low-level gamma voltage adjustment value to the DAC. The first auxiliary latch AGMT may store the first high-level gamma voltage adjustment value and the first low-level gamma voltage adjustment value during the second horizontal period H2, and then, may supply the first high-level gamma voltage adjustment value and the first low-level gamma voltage adjustment value to the DAC. Likewise, the first auxiliary latch AGMT may store the first high-level gamma voltage adjustment value and the first low-level gamma voltage adjustment value during the $n^{th}$ horizontal period Hn, and then, may supply the first high-level gamma voltage adjustment value and the first low-level gamma voltage adjustment value to the DAC.

As in FIG. 6B, during one frame, a gamma voltage adjuster of the DAC may increase the high-level gamma voltage HVref by one horizontal period units, based on the first to $n^{th}$ high-level gamma voltage adjustment values, and may decrease the low-level gamma voltage LVref by one horizontal period units, based on the first to $n^{th}$ low-level gamma voltage adjustment values. As a result, in one frame, voltage differences D1, . . . , and Dn between the high-level gamma voltage HVref and the low-level gamma voltage LVref may increase as a time elapses toward the $n^{th}$ horizontal period Hn from the first horizontal period H1.

Accordingly, the DAC may map image data to gamma voltages obtained through voltage division by the plurality of tap nodes between the high-level gamma voltage HVref and the low-level gamma voltage LVref to generate data voltages.

Figure 7:
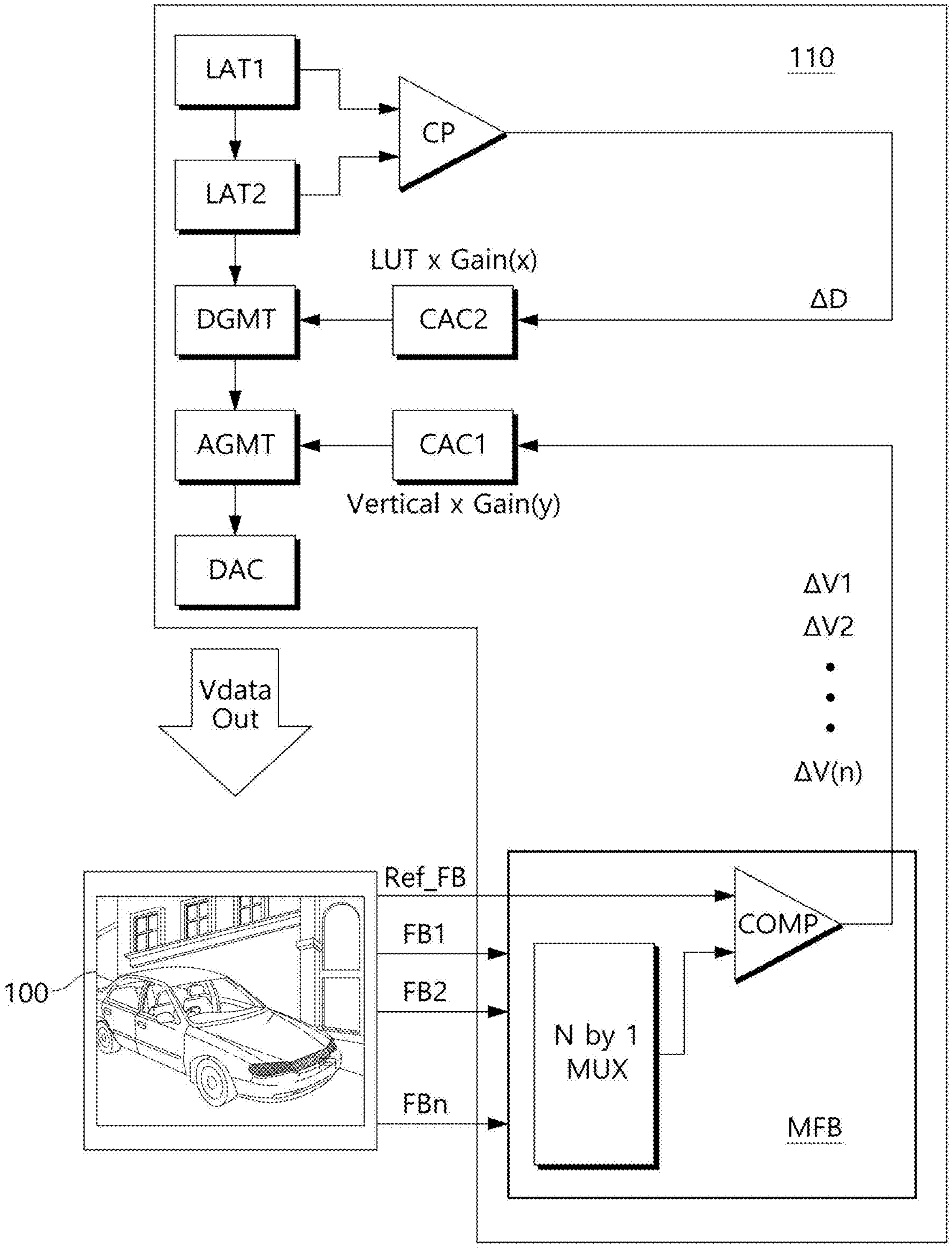
FIG. 7 is a diagram illustrating a configuration of a source driver to which an analog compensation concept of a multi-feedback scheme and a digital compensation concept of a line data comparison scheme are applied.

FIG. 7 is a diagram illustrating a configuration of a source driver to which an analog compensation concept of a multi-feedback scheme and a digital compensation concept of a line data comparison scheme are applied. FIG. 8 is a lookup table storing intermediate compensation values based on data deviation values.

Referring to FIG. 7, an analog compensation concept of a multi-feedback scheme may be implemented with a source driver 110 which includes a multi-feedback circuit MFB, a first calculation circuit CAC1, a first auxiliary latch AGMT, and a DAC. This may be the same as the descriptions of FIGS. 5 to 6B, and thus, repeated descriptions are omitted.

Referring to FIG. 7, a digital compensation concept of a line data comparison scheme may be implemented with a source driver 110 which includes a first latch LAT1, a second latch LAT2, a digital comparator CP, a second calculation circuit CAC2, and a second auxiliary latch DGMT.

Each of the first latch LAT1 and the second latch LAT2 may be a line memory. The first latch LAT1 may store image data of one pixel row which is to be written in the first pixel row. The second latch LAT2 may store image data of one pixel row which is to be written in the second pixel row adjacent to the first pixel row.

The digital comparator CP may compare a first latch storage value, stored in the first latch LAT1, with a second latch storage value stored in the second latch LAT2 to output a data deviation value ΔD by one horizontal period units. The data deviation value ΔD may be implemented as a maximum difference value or an average difference value between the first latch storage value and the second latch storage value.

The second calculation circuit CAC2 may multiply an intermediate compensation value based on the data deviation value ΔD by a predetermined position-based compensation gain Gain(x) to output a final compensation value. At this time, as in FIG. 8, the intermediate compensation value based on the data deviation value ΔD may be previously stored in a lookup table LUT by gray level units. The second calculation circuit CAC2 may read the intermediate compensation value from the lookup table LUT by using, as a read address, the data deviation value ΔD which is input by one horizontal period units, and then, may multiply the read intermediate compensation value by the position-based compensation gain Gain(x) to output a final compensation value. The position-based compensation gain Gain(x) may be differently set based on each of the first to $n^{th}$ horizontal periods. Also, the intermediate compensation value may be designed under a condition where a center luminance of the display panel is a target value. This may be based on a luminance uniformity of a display surface.

The second auxiliary latch DGMT may correct image data with the final compensation value, and then, may supply corrected image data to the first auxiliary latch AGMT.

The first auxiliary latch AGMT may store first to $n^{th}$ high-level gamma voltage adjustment values and first to $n^{th}$ low-level gamma voltage adjustment values, and then, may supply the first to $n^{th}$ high-level gamma voltage adjustment values and the first to $n^{th}$ low-level gamma voltage adjustment values to the DAC. Also, the first auxiliary latch AGMT may bypass the corrected image data, supplied from the second auxiliary latch DGMT, to the DAC.

Therefore, the DAC may map the corrected image data to gamma voltages obtained through voltage division by a plurality of tap nodes between a high-level gamma voltage HVref and a low-level gamma voltage LVref varying at every one horizontal period and may thus generate data voltages.

When the analog and digital compensation concepts are all applied, an image data modulation operation for position-based luminance compensation may be further performed in addition to a position-based gamma voltage adjustment operation, and thus, a panel position-based charging deviation may be more effectively reduced.

Figure 9:
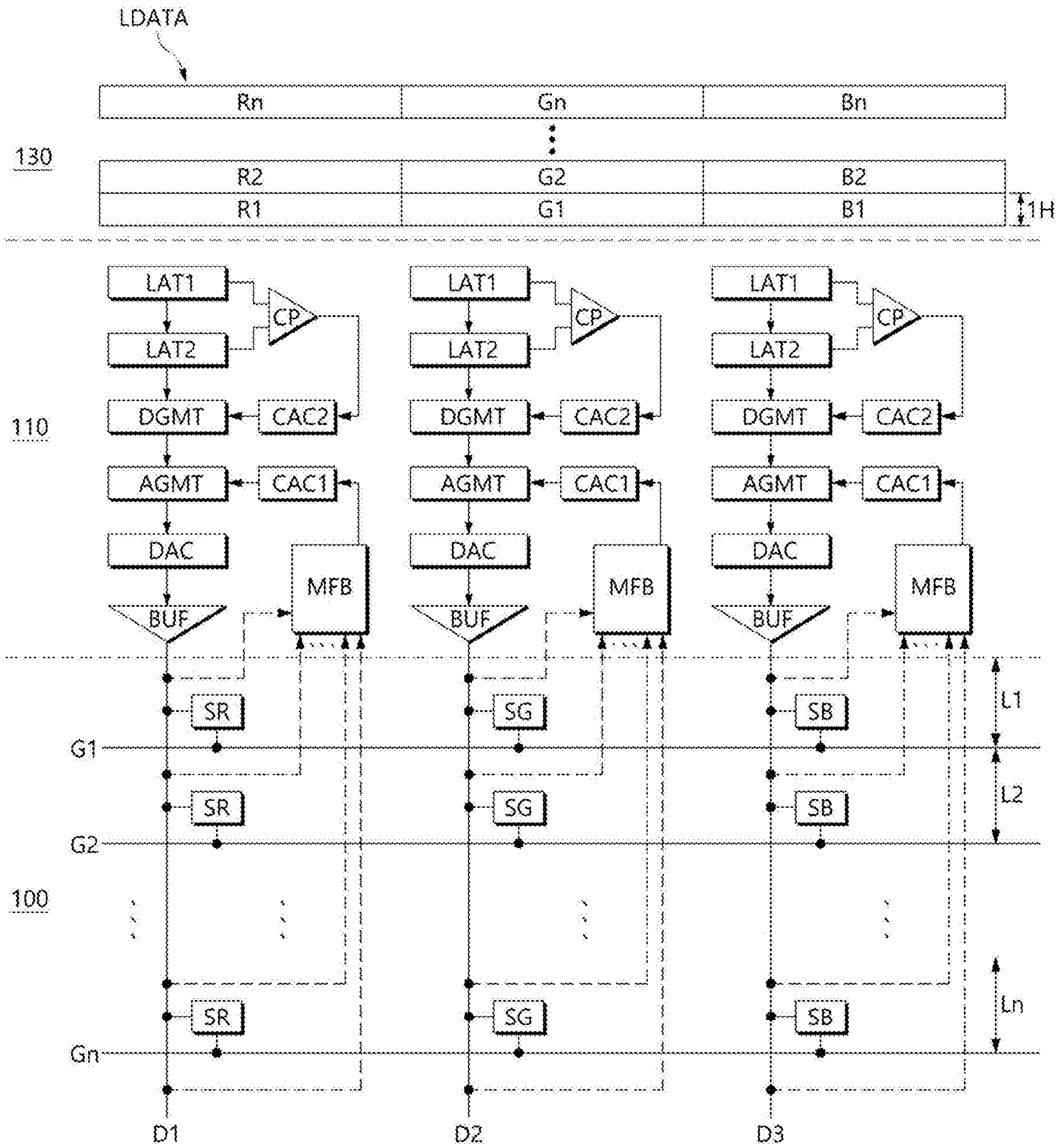
FIG. 9 is a diagram illustrating a detailed application example of FIG. 7.

FIG. 9 is a diagram illustrating a detailed application example of FIG. 7.

Referring to FIG. 9, a circuit unit for implementing the analog and digital compensation concepts may be provided for each output channel of a source driver 110. In FIG. 9, an R output channel connected to a first data line D1 for driving R subpixels SR, a G output channel connected to a second data line D2 for driving G subpixels SG, and a B output channel connected to a third data line D3 for driving B subpixels SB are illustrated.

A detailed description of the circuit unit for implementing the analog and digital compensation concepts may be substantially the same as the above descriptions.

Figure 10A:
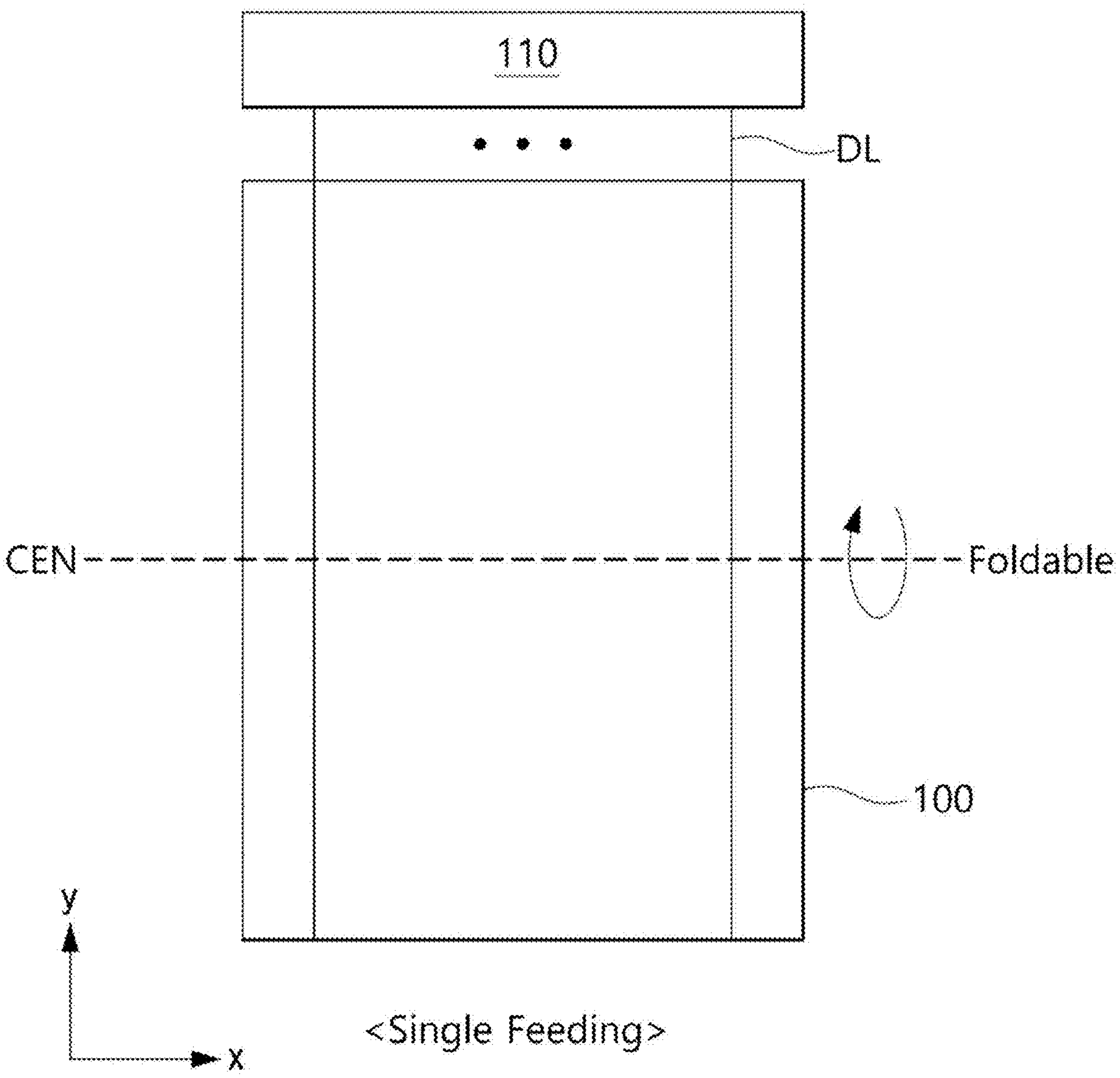
FIG. 10A illustrates a foldable display apparatus supplying a data voltage by using a single feeding scheme.
Figure 10B:
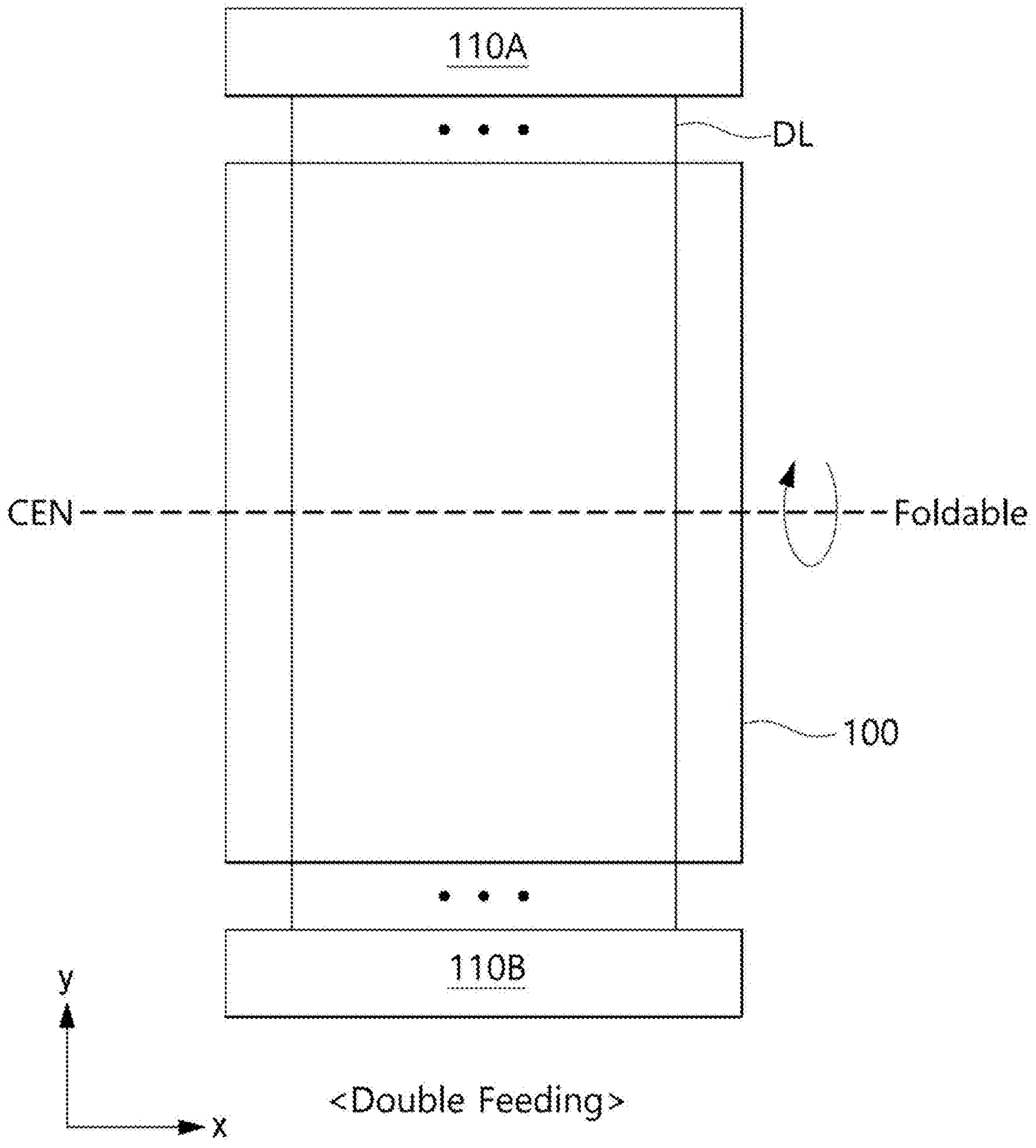
FIG. 10B illustrates a foldable display apparatus supplying a data voltage by using a double feeding scheme.

FIG. 10A illustrates a foldable display apparatus supplying a data voltage by using a single feeding scheme. FIG. 10B illustrates a foldable display apparatus supplying a data voltage by using a double feeding scheme.

The embodiments for improving a panel position-based charging deviation described above with reference to FIGS. 1 to 9 may be applied to the foldable display apparatus of FIGS. 10A and 10B. The foldable display apparatus may include a display panel 100 which is foldable with respect to a center portion of the display panel 100.

In the foldable display apparatus of FIGS. 10A and 10B, a panel length in an X-axis direction may be greater than a panel length in a Y-axis direction. The Y-axis direction may be a direction in which data lines SL extend.

In the foldable display apparatus of the single feeding scheme illustrated in FIG. 10A, a source driver 110 disposed at only one side of the display panel 100 may supply data voltages to the data lines DL. As described above, the single feeding scheme may be a scheme which supplies a data voltage in a single direction by using the source driver 110 of the one side of the display panel 100.

In the foldable display apparatus of the double feeding scheme illustrated in FIG. 10B, first and second source drivers 110A and 110B disposed at both sides of the display panel 100 may supply data voltages to the data lines DL. The first and second source drivers 110A and 110B may drive the same data lines DL at the both sides of the display panel 100. As described above, the double feeding scheme may be a scheme which supplies a data voltage in both directions by using the source driver 110 of the both sides of the display panel 100.

Because the single feeding scheme is less in number of source drivers than the double feeding scheme, power consumption and the manufacturing cost may be favorable. However, a panel position-based charging deviation may be greater in the single feeding scheme than the double feeding scheme. Such a problem, as described above, may more increase in the display panel 100 where the panel length in the Y-axis direction is relatively long.

Therefore, when the display panel 100 where the panel length in the Y-axis direction is relatively long is driven based on the single feeding scheme, the embodiments of FIGS. 1 to 9 described above may be more effective. When the embodiments described above are applied to the foldable display apparatus of the single feeding scheme, a difference of panel position-based charging slew rates may be considerably improved.

The embodiments of the present disclosure may realize the following effect.

The embodiments of the present disclosure may decrease a panel position-based charging deviation to improve image quality.

The effects according to the present disclosure are not limited to the above examples, and other various effects may be included in the specification.

The description herein has been presented to enable any person skilled in the art to make, use and practice the technical features of the present disclosure, and has been provided in the context of one or more particular example applications and their example requirements. Various modifications, additions and substitutions to the described embodiments will be readily apparent to those skilled in the art, and the principles described herein may be applied to other embodiments and applications without departing from the scope of the present disclosure. The description herein and the accompanying drawings provide examples of the technical features of the present disclosure for illustrative purposes. In other words, the disclosed embodiments are intended to illustrate the scope of the technical features of the present disclosure. Thus, the scope of the present disclosure is not limited to the embodiments shown, but is to be accorded the widest scope consistent with the claims. The scope of protection of the present disclosure should be construed based on the following claims, and all technical features within the scope of equivalents thereof should be construed as being included within the scope of the present disclosure.

What is claimed is:

1. A display apparatus, comprising:

a display panel; and a source driver including a digital-to-analog converter configured to map image data to gamma voltages, obtained through voltage division between a high-level gamma voltage and a low-level gamma voltage, to generate a data voltage and output the data voltage to a data line of the display panel, wherein a voltage difference between the high-level gamma voltage and the low-level gamma voltage is different at a first time and a second time in one frame.

2. The display apparatus of claim 1, wherein the source driver further comprises a gamma circuit configured to voltage-divide the voltage difference between the high-level gamma voltage and the low-level gamma voltage to generate the gamma voltages, based on a gray level of the image data.

3. The display apparatus of claim 1, wherein the display panel comprises:

a first pixel row including a plurality of first pixels; and a second pixel row including a plurality of second pixels and disposed farther away from an output terminal of the source driver than the first pixel row, and the voltage difference between the high-level gamma voltage and the low-level gamma voltage is greater in a second horizontal period, where the second pixel row is charged, than a first horizontal period where the first pixel row is charged.

4. The display apparatus of claim 1, wherein the data voltage output from the digital-to-analog converter, corresponding to the image data of the same gray level, increases over time in the one frame.

5. The display apparatus of claim 1, wherein, in the one frame, the high-level gamma voltage increases over time in the one frame, and the low-level gamma voltage decreases over time in the one frame.

6. The display apparatus of claim 5, wherein the source driver comprises:

a multi-feedback circuit configured to receive a reference feedback voltage at a reference position of the data line, receive first to $n^{th}$ feedback voltages at first to $n^{th}$ positions of the data line, and compare the reference feedback voltage with each of the first to $n^{th}$ feedback voltages to sequentially output first to $n^{th}$ deviation values;

a first calculation circuit configured to output first to $n^{th}$ high-level gamma voltage adjustment values and first to $n^{th}$ low-level gamma voltage adjustment values, based on the first to $n^{th}$ deviation values sequentially input thereto; and a first auxiliary latch configured to store the first to $n^{th}$ high-level gamma voltage adjustment values and the first to $n^{th}$ low-level gamma voltage adjustment values, and then, supply the stored first to $n^{th}$ high-level gamma voltage adjustment values and first to $n^{th}$ low-level gamma voltage adjustment values to the digital-to-analog converter.

7. The display apparatus of claim 6, wherein the display panel comprises first to $n^{th}$ pixel rows, the first to $n^{th}$ positions of the data line respectively correspond to the first to $n^{th}$ pixel rows of the display panel, and the reference position of the data line is closer to an output terminal of the source driver than each of the first to $n^{th}$ positions of the data line.

8. The display apparatus of claim 7, wherein, during the one frame, a gamma voltage adjuster included in the digital-to-analog converter increases the high-level gamma voltage by one horizontal period unit, based on the first to $n^{th}$ high-level gamma voltage adjustment values, and decreases the low-level gamma voltage by one horizontal period unit, based on the first to $n^{th}$ low-level gamma voltage adjustment values.

9. The display apparatus of claim 6, wherein the source driver further comprises:

a comparator configured to compare a first latch storage value of image data, which is to be written in a first pixel row, with a second latch storage value of image data to be written in a second pixel row adjacent to the first pixel row to output a data deviation value by one horizontal period unit;

a second calculation circuit configured to multiply an intermediate compensation value based on the data deviation value by a predetermined position-based compensation gain to output a final compensation value; and a second auxiliary latch configured to correct corresponding image data, based on the final compensation value, and then, supply the corrected image data to the digital-to-analog converter.

10. The display apparatus of claim 9, wherein the intermediate compensation value corresponding to the data deviation value is previously stored in a lookup table by gray level units.

11. The display apparatus of claim 10, wherein, in the intermediate compensation value, a center luminance of the display panel is a target value.

* * * * *